June 29, 1954 W. T. ISBELL 2,682,332
VIBRATORY FEEDER
Filed Sept. 11, 1951 2 Sheets-Sheet 1

INVENTOR
WILLIAM T. ISBELL

BY Stowell + Evans
ATTORNEYS

June 29, 1954 W. T. ISBELL 2,682,332
VIBRATORY FEEDER

Filed Sept. 11, 1951 2 Sheets-Sheet 2

INVENTOR
WILLIAM T. ISBELL
BY Stowell + Evans
ATTORNEYS

Patented June 29, 1954

2,682,332

UNITED STATES PATENT OFFICE 2,682,332

VIBRATORY FEEDER

William T. Isbell, Herculaneum, Mo., assignor to St. Joseph Lead Company, New York, N. Y., a corporation of New York Application September 11, 1951, Serial No. 246,008

1 Claim. (Cl. 198—106)

This invention relates to an improved vibratory feeder and more particularly to a vibratory feeder for pulverulent material adapted to deliver a substantially uniform charge, both as to segregation of particles and as to the thickness of the pulverulent material distributed.

It is a principal object of the invention to provide such a device wherein the feed material will be discharged uniformly along the entire discharge edge of the feeder.

A further object is to provide such a device wherein the rate of feed may be positively and effectively controlled.

Another object of the invention is to provide a feeder for pulverulent material which is simple as to its parts and readily adaptable to various feeding conditions.

These and other objects of the invention will be more fully disclosed with reference to one form of the vibratory feeder of the invention as applied to a sintering machine where uniformity of feed is an essential requirement, as shown in the illustrative embodiments of the invention in which.

Figure 1:
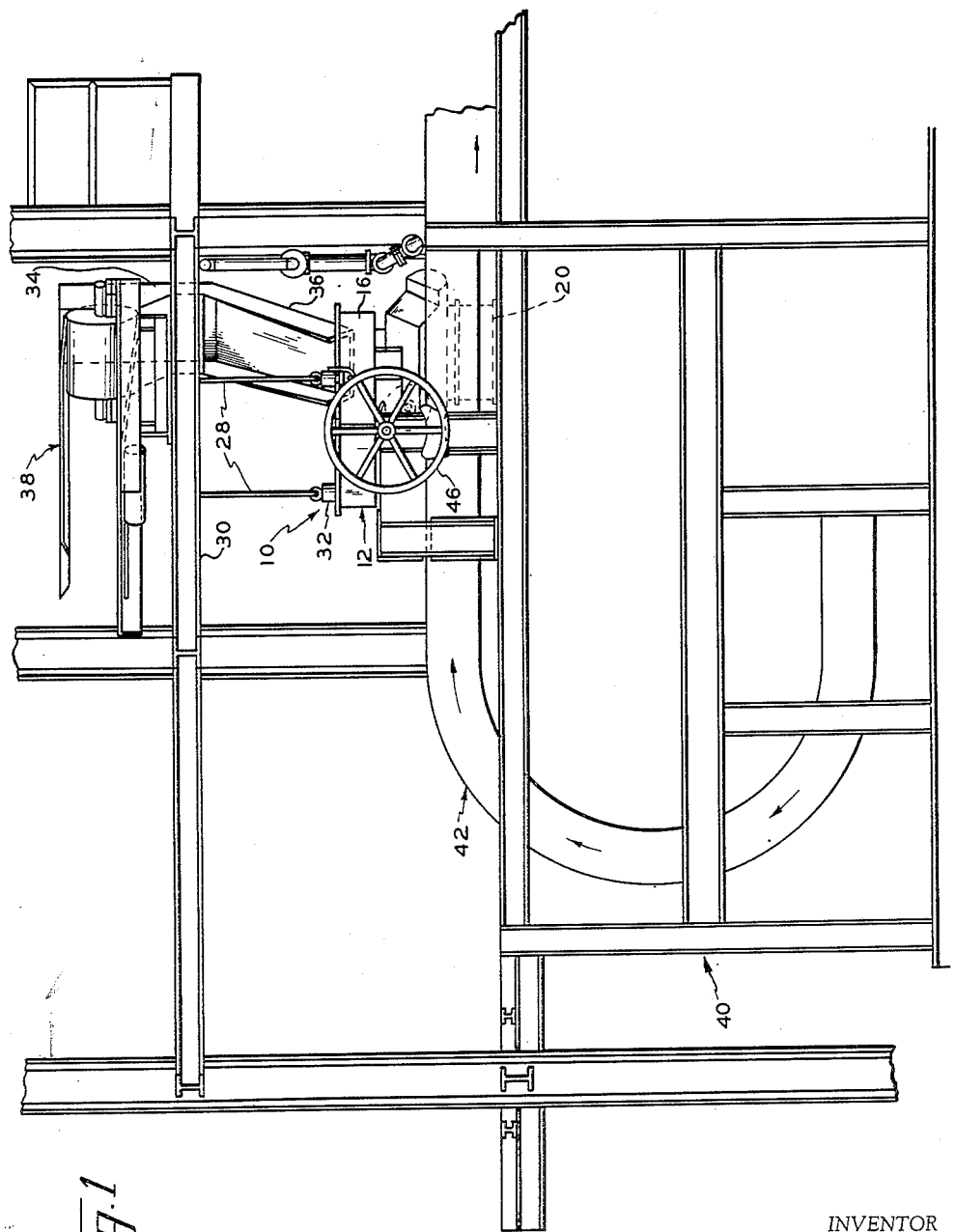
Fig. 1 is a fragmentary side elevation of a sintering machine including the vibratory feeder of the invention.
Figure 2:
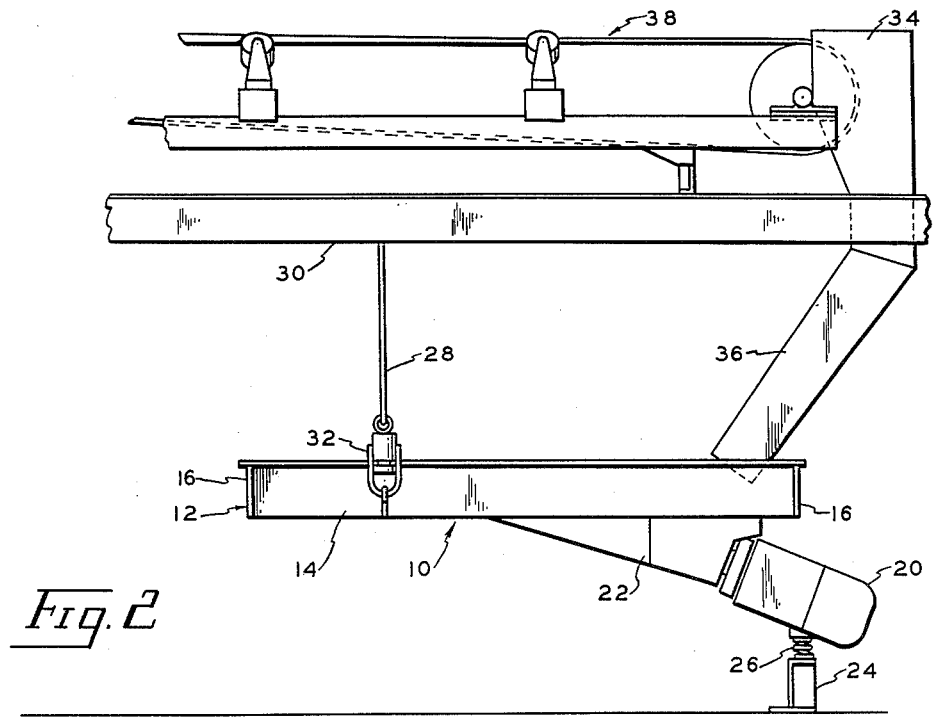
Fig. 2 is a detailed side view of the feeder shown in Fig. 1, with the bed of the sintering machine removed to show more clearly the feeder suspension and drive mechanism.

In the art of sintering ores the ore mix or charge for the sintering machine must be carefully prepared and deposited on the bed of the sintering furnace. After the ores, or concentrates, and fluxes have been pelletized or agglomerated in, for example, rotary mixing drums, it has been the practice in industry to convey the mix directly to the sintering machine without storing and with a minimum of handling in order to insure uniformity of the charge. Even with careful handling of the mix, for efficient sintering the charge must be uniformly distributed across the furnace bed and of a definite uniform thickness or during the sintering operation blowholes will form in the thin or loosely packed portion of the furnace bed which will cause draft deficiencies in other portions of the bed. This causes uneven sintering and may result in portions of the charge being unsintered, thereby substantially decreasing the furnace output and greatly increasing the cost of production.

In the past it has been the practice to distribute the mix to the traveling furnace bed of sintering machines by swinging spouts, or by large conveyors. However, neither of these methods have proved entirely satisfactory even when spreader bars are employed to aid in leveling the deposited mix on the furnace bed.

The wider the furnace bed the more difficult it becomes to lay down a uniform bed with swinging spouts, standard conveyors and chutes, while with the device of the invention it will be seen that by merely lengthening and widening the feeder bed to provide a discharge lip substantially equal to the width of the furnace bed, renders the feeder of the invention readily adaptable to various feeding conditions.

It has been found that very satisfactory results are obtainable by feeding the charge upon the traveling furnace bed by means of the vibratory feeder of the invention which comprises generally a trough-like conveyor suspended in a plane substantially parallel to the bed to be formed with the longitudinal axis of the conveyor angularly disposed to the longitudinal axis of the bed, a discharge edge for the trough substantially normal to the longitudinal axis of the bed, and means for vibrating the trough parallel to its longitudinal axis.

Referring to the drawings 10 is the vibratory feeder of the invention which comprises a substantially rectangular trough 12, provided with side and end members 14 and 16, respectively. In the base of the trough an angular discharge slot 18 is provided, the edge 19 of which forms the discharge edge of the feeding device.

In order to impart a vibratory motion to the trough there is provided at the rear or material receiving end of the feeder a vibratory motor 20, which may be of any suitable electric, hydraulic, pneumatic or internal combustion type.

The motor 20 is attached to the trough by means of brackets or side plates 22 which are rigid with the base of the trough so that there will be imparted to the feeder a vibratory motion having both a vertical and a horizontal component relative to the plane of the trough.

The motor casing is preferably flexibly supported upon standards 24, provided with coil springs 26, while the forward end of the trough is flexibly supported by hanger rods 28. Rods 28 are pivotally attached to the support beams 30 at their upper ends and are provided with eye clamp assemblies 32 at their lower ends.

The vibratory feeder shown in the illustrative embodiments of the invention is fed by means of a hopper 34, and chute 36 which receive the mix, after processing, from the endless belt conveyor generally designated 38.

Figure 3:
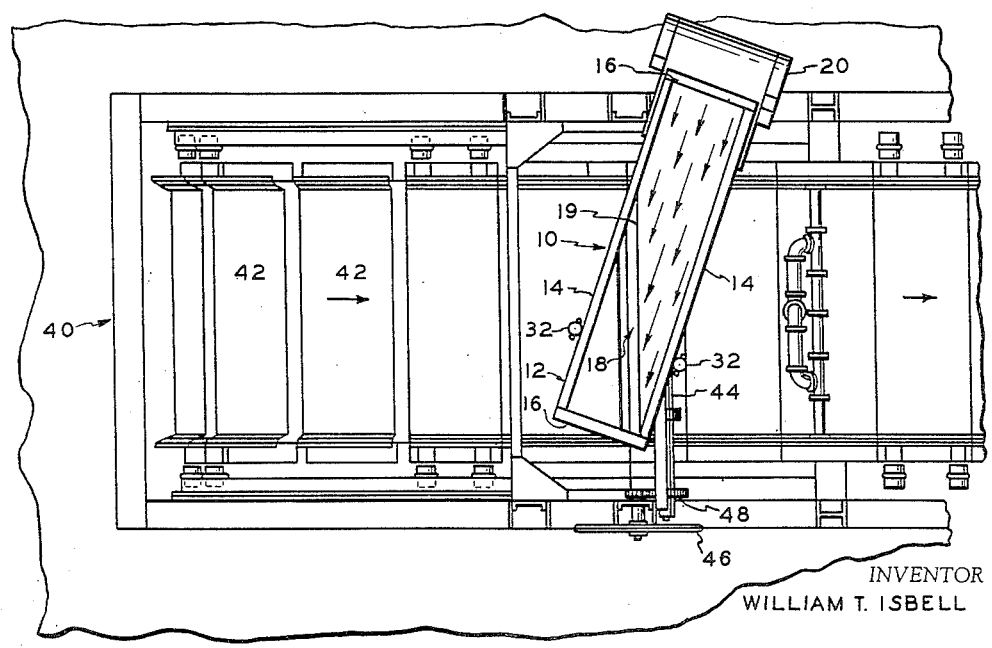
Fig. 3 is a fragmentary top view of the machine shown in Fig. 1 with the top supporting means for the feeder removed.

With particular reference to Figs. 1 and 3, 40 is the charge receiving end of a typical sintering machine having an endless traveling bed 42 which after receiving the mix moves in the direction of the arrows into the furnace, not shown in the drawings.

The longitudinal axis of the trough 12 is angularly disposed to the longitudinal axis of the furnace bed 42, whereby material to be discharged onto the bed moves down the trough parallel to its longitudinal axis and at an angle to the bed of the sinter machine as clearly shown by the arrows in Fig. 3 of the drawings. The discharge edge 19 of the trough is substantially normal to the direction of travel of bed 42 and is therefore angularly disposed to the longitudinal axis of the trough 12 and to the direction of flow of the feed material. The length of the discharge edge 19 is substantially equal to the width of the furnace bed 42, so that a layer of mix the width of the traveling bed is laid down as the bed passes beneath the discharge edge 19 of the trough 12.

The depth of the mix may be controlled by the amplitude of the vibration imparted to the trough by the motor 20, and it has been found that the depth of the charge on the furnace bed may be regulated as much as one hundred per cent by changing the amplitude of the vibrations without substantially affecting the uniform deposition of the charge upon the bed.

With the device of the invention a leveling gate such as shown at 44 controllable, for example, by the hand wheel 46 through a gear train 48 may be effectively used without the danger of uneven packing of the sinter bed, since the fine and coarse particles of the mix are substantially uniformly distributed across the width of the bed of the furnace, the entire bed is uniformly levelled by the gate 44.

On installations where standard conveyors or swinging spouts are employed to distribute the mix to the traveling furnace bed, it has generally been necessary to employ rakes, chains and the like following the leveling bar to loosen up the charge before it reaches the ignition zone of the sintering machine. It has been found, however, that this additional step is not necessary with the device of the invention as the feeder lays down a charge on the bed of the machine that is more fluffy or open than those produced by standard feeding methods, giving substantially better ignition and burning of the charge.

The structure of the vibratory feeder herein shown and described may be variously modified and changed as to details of construction and operation to suit different requirements and conditions. For example, in the drawings, the trough of the feeder is shown as being substantially rectangular in shape and provided with a discharge slot angularly positioned with respect to the longitudinal axis of the trough and the direction of flow of the material to be discharged. However, the trough may be of any convenient shape or size, and the discharge edge of the feeder may be formed as one side of the trough, without affecting the principles of operation of the feeder of the invention.

From the foregoing description it will be seen that the present invention provides an improved vibratory feeder for pulverulent material, whereby the aims, objects and advantages of the invention are fully accomplished.

I claim:

A system of conveyors comprising a first conveyor, said first conveyor comprising a trough, a motor for vibrating the trough to impart a conveying action to material carried thereby and a discharge edge for the trough angularly disposed to the longitudinal axis of the trough, and a second conveyor beneath the first conveyor and disposed with its longitudinal axis normal to the discharge edge of the first conveyor.

References Cited in the file of this patent

UNITED STATES PATENTS

| Number | Name | Date |
|---|---|---|
| 1,776,568 | O'Neale | Sept. 23, 1930 |
| 1,840,294 | Richards | Jan. 5, 1932 |
| 2,219,954 | Geiger et al. | Oct. 29, 1940 |
| 2,539,070 | Gebo | Jan. 23, 1951 |

FOREIGN PATENTS

| Number | Country | Date |
|---|---|---|
| 19,338 | Great Britain | Apr. 25, 1895 |